(12) United States Patent
Leppäkangas et al.

(10) Patent No.: US 11,892,280 B2
(45) Date of Patent: Feb. 6, 2024

(54) METHOD AND APPARATUS FOR PLAIN BEARING CRUSH HEIGHT MEASUREMENT

(71) Applicant: Wärtsilä Finland Oy, Vaasa (FI)

(72) Inventors: Janne Leppäkangas, Vaasa (FI); Pasi Halla-aho, Vaasa (FI); Jaakko Istolahti, Vaasa (FI); Jukka-Pekka Vesala, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 521 days.

(21) Appl. No.: 17/269,622

(22) PCT Filed: Aug. 21, 2018

(86) PCT No.: PCT/FI2018/050591
§ 371 (c)(1),
(2) Date: Feb. 19, 2021

(87) PCT Pub. No.: WO2020/039113
PCT Pub. Date: Feb. 27, 2020

(65) Prior Publication Data
US 2021/0190477 A1 Jun. 24, 2021

(51) Int. Cl.
*G01B 11/02* (2006.01)
*G06T 7/55* (2017.01)
(Continued)

(52) U.S. Cl.
CPC .......... *G01B 11/026* (2013.01); *F16C 17/022* (2013.01); *G01M 13/04* (2013.01); *G06T 7/55* (2017.01)

(58) Field of Classification Search
CPC ....... G01B 11/026; G06T 7/55; F16C 17/022; G01M 13/04
(Continued)

(56) References Cited

U.S. PATENT DOCUMENTS 4,235,481 A * 11/1980 Fukuoka ............... F16C 17/022
384/429
8,689,457 B2 * 4/2014 Haller ................... G01M 13/04
33/517
(Continued)

FOREIGN PATENT DOCUMENTS

EP 0909899 A2 4/1999
JP 108128435 A 5/1996

OTHER PUBLICATIONS

International Search Report, Application No. PCT/FI2018/050591, dated Apr. 12, 2019, 14 pages.

*Primary Examiner* — George B Bennett
(74) *Attorney, Agent, or Firm* — Ziegler IP Law Group

(57) ABSTRACT

A method and apparatus for determining crush height of a plain bearing shell, including a light source for forming illuminating light to the plain bearing shell; a sensor device configured to capture an image; at least one memory including computer program code; the at least one memory and the computer program code configured to, with the at least one processor, cause the apparatus to: capture a first image of the plain bearing shell in a first mode, wherein no external compression stress in a circumference direction of the plain bearing shell is formed; generate plain bearing data based on the first captured image; maintain housing reference data including at least diameter information of a bore for receiving the plain bearing shell; and determine crush height of the plain bearing shell based on the plain bearing data and the housing reference data.

20 Claims, 5 Drawing Sheets

(51) Int. Cl.
*F16C 17/02* (2006.01)
*G01M 13/04* (2019.01)

(58) Field of Classification Search
USPC .......................................................... 33/517
See application file for complete search history.

(56) References Cited

U.S. PATENT DOCUMENTS

| | | | |
|---|---|---|---|
| 8,714,825 B2 * | 5/2014 | Koushima | F16C 33/1065 |
| | | | 384/294 |
| 11,555,794 B1 * | 1/2023 | McCarthy | G01N 23/207 |
| 2012/0011734 A1 | 1/2012 | Haller et al. | |
| 2016/0377505 A1 * | 12/2016 | Karasawa | A61B 6/035 |
| | | | 73/865.9 |
| 2020/0063797 A1 * | 2/2020 | Takata | F16C 9/02 |
| 2021/0254660 A1 * | 8/2021 | Kato | F16C 33/046 |
| 2022/0042879 A1 * | 2/2022 | Zhou | G01M 13/04 |
| 2022/0082128 A1 * | 3/2022 | Suzuki | F16C 33/7883 |
| 2023/0125524 A1 * | 4/2023 | Salvadé | B25J 19/021 |
| | | | 356/614 |

* cited by examiner

METHOD AND APPARATUS FOR PLAIN BEARING CRUSH HEIGHT MEASUREMENT

TECHNICAL FIELD

The present application generally relates to plain bearing crush height measurement method, device and apparatus.

BACKGROUND

This section illustrates useful background information without admission of any technique described herein representative of the state of the art.

The disclosed embodiments relate to a half plain bearing which is produced in a form of a half shell so as to form a cylindrical shape when two units of the half plain bearings are combined.

Conventionally, when half plain beatings produced in the form of a half shell so that a combination of two units will form a cylindrical shape are mounted in a housing, they may not match their ends with each other at parting lines, or if crush height of the half plain bearings is too large, the plain bearings may be deformed near the parting lines of the ends, and swell inward in the radial direction so as to cause local interference with the shaft. The crush reliefs may be provided to correct the local deformations or misalignment which occur at the parting lines of the half plain bearings, and their depth, length, etc. are determined on the basis of housing rigidity, accuracy, and operating conditions.

Peripheral length is one of most critical features of the half shell bearings. Assembly of a half shell bearing is based on radial pressure between a bearing housing and the shell. Bearing peripheral length on free conditions is greater than circular length of the bearing housing, and the radial pressure is created by pressing two half shells to the bearing housing so that the peripheral length difference is pressed away.

The difference of bearing peripheral length between assembled conditions and free conditions is called bearing nip or crush height. Nip is always defined under a test pressure on the housing.

Traditionally the bearing peripheral length is measured by a nip checking machine or tool. This requires a special equipment or tool to be used that is cumbersome in size and requires a bearing specific checking block. Such approach is not always possible in field circumstances.

Thus, a solution is needed to enable accurate, easy-to-use, and reliable measurement of plain bearing crush height.

SUMMARY

Various aspects of examples of the embodiments are set out in the claims.

According to a first example aspect of the disclosed embodiments, there is provided an apparatus for determining crush height of a plain bearing shell, comprising:

a light source for forming illuminating light to the plain bearing shell;
a sensor device configured to capture an image;
at least one memory including computer program code; the at least one memory and the computer program code configured to, with the at least one processor, cause the apparatus to:
capture a first image of the plain bearing shell in a first mode, wherein no external compression stress in a circumference direction of the plain bearing shell is formed;
generate plain bearing data based on the first captured image;
maintain housing reference data comprising at least diameter information of a bore for receiving the plain bearing shell; and
determine crush height of the plain bearing shell based on the plain bearing data and the housing reference data.

In an embodiment, the plain bearing data comprises at least one of the following: a circumferential length of the plain bearing shell; a free spread of the plain bearing shell; a plain bearing shell form; and a thickness of the plain bearing shell.

In an embodiment, the at least one memory and the computer program code are configured to, with the at least one processor, cause the apparatus to:
determine outside circumferential length of the plain bearing shell based on the first captured image; and
determine the plain bearing data to comprise the outside circumferential length of the plain bearing shell.

In an embodiment, the at least one memory and the computer program code are configured to, with the at least one processor, cause the apparatus to:
maintain plain bearing reference data comprising material information of at least one plain bearing shell.

In an embodiment, the at least one memory and the computer program code are configured to, with the at least one processor, cause the apparatus to:
maintain housing reference data further comprising material information of at least one housing with the bore for receiving the plain bearing shell.

In an embodiment, the material information is configured to be used to determine coefficient of thermal expansion for at least one of the plain bearing shell and the housing.

In an embodiment, the at least one memory and the computer program code are configured to, with the at least one processor, cause the apparatus to:
maintain environmental data comprising current measurement temperature and plain bearing shell operating temperature.

In an embodiment, the at least one memory and the computer program code are configured to, with the at least one processor, cause the apparatus to:
determine material information of the plain bearing shell based on the captured first image and the plain bearing reference data; and
determine coefficient of thermal expansion for the plain bearing shell based on the material information.

In an embodiment, the at least one memory and the computer program code are configured to, with the at least one processor, cause the apparatus to:
capture a second image of the plain bearing shell in a second mode, wherein the plain bearing shell is fitted to the bore of the housing and external compression stress in a circumference direction of the plain bearing shell is formed; and generate the housing reference data based on the second image.

In an embodiment, the at least one memory and the computer program code are configured to, with the at least one processor, cause the apparatus to:
determine material information of the housing based on the captured second image and the housing reference data; and
determine coefficient of thermal expansion for the housing based on the material information.

In an embodiment, the at least one memory and the computer program code are configured to, with the at least one processor, cause the apparatus to:

maintain environmental data comprising current measurement temperature and plain bearing shell operating temperature.

receive target contact pressure for the plain bearing shell to press to the housing surface when in the operating temperature;

determine material information of the plain bearing shell based on the first image;

determine material information of the housing based on the second image;

determine operation crush height of the plain bearing shell based on the material information and the environmental data;

define target crush height based on the operation crush height and the environmental data;

compare the target crush height with the determined crush height; and approve the plain bearing shell for installation for operation if the determined crush height is bigger than the target crush height.

In an embodiment, the light source comprises a plurality of light transmitters, at least one of them is configured to emit light in different spectral band and/or in different intensity, wherein at least one of the light transmitters is configured to emit light with wavelength between 800-2600 nm and/or with adjustable intensity.

In an embodiment, the apparatus further comprises a communication interface for transceiving information, wherein the at least one memory and the computer program code configured to, with the at least one processor, cause the apparatus to:

receive settings, from a cloud server, comprising at least one of the following:
  environmental data;
  plain bearing reference data;
  plain bearing data; and
  housing reference data; and
adjust corresponding data at the apparatus based on the settings.

In an embodiment, the sensor device comprises a storage element operable to output a sequence of reset and measurement values; and a configurable sampler coupled to the storage element to sample the sequence of reset and measurement values within an exposure interval, the exposure interval encompassing a plurality of measurement intervals, the sampler supporting sample modes, including: a first sample mode operable to produce a first output derived from one of the reset values and an adjacent measurement value, the first sample mode operating in a first of the measurement intervals; a second sample mode operable to produce a second output derived from one of the measurement values and an adjacent reset value, the second sample mode operating in a second of the measurement intervals; and a transition mode operable to switch between the first and second sample modes responsive to at least one of the first and second outputs, the transition between the first and second sample modes occurring within the exposure interval.

In an embodiment, the apparatus is configured to:
define a first operational mode, wherein a photodetector of the sensor device is reset after each measurement interval, and pixel's intensity is measured with reference to that pixel's reset value;
define a second operational mode, wherein the photodetector of the sensor device is allowed to charge to accumulate on photodiode of the sensor device over multiple measurement intervals during an exposure, and pixel's intensity is measured with reference to that pixel's reset value; and
define a third operational mode, wherein pixel's intensity is measured with respect to a reference that is not derived from the pixel.

The apparatus may further be configured to select used operational mode based on at least one of the following: ambient light information provided by an ambient light sensor, used wavelength(s) for illumination, and reference data maintained for the measured plain bearing shell.

In an embodiment, the at least one memory and the computer program code configured to, with the at least one processor, cause the apparatus to:
determine crush height of a first plain bearing shell based on the plain bearing data associated with the first plain bearing shell and the housing reference data;
determine crush height of a second plain bearing shell based on plain bearing data associated with the second plain bearing shell; and
select the second plain bearing shell to be paired with the first plain bearing shell based on the plain bearing data associated with the first and the second plain bearing shells and the housing reference data.

In an embodiment, the at least one memory and the computer program code configured to, with the at least one processor, cause the apparatus to:
determine a plurality of parameters based on optical measurement, comprising at least two of the following: a circumferential length of the bearing; a free spread of the bearing; a bearing shell form; and a thickness of the bearing;
determine a weight value and a range for the determined parameters where the plain bearing shell is acceptable as a single plain bearing shell and as combination with another plain bearing shell to provide weighted parameters; and
determine pairing of the plain bearing shells for an assembly bore by selecting the paired plain bearing shells based on the weighted parameters.

According to a second example aspect of the disclosed embodiments, there is provided a computer program embodied on a computer readable non-transitory medium comprising computer executable program code, which code, when executed by at least one processor of an apparatus, causes the apparatus to:
capture a first image of the plain bearing shell in a first mode, wherein no external compression stress in a circumference direction of the plain bearing shell is formed;
generate plain bearing data based on the first captured image;
maintain housing reference data comprising at least diameter information of a bore for receiving the plain bearing shell; and
determine crush height of the plain bearing shell based on the plain bearing data and the housing reference data.

According to a third example aspect of the disclosed embodiments, there is provided a computer implemented method for determining crush height of a plain bearing shell, comprising:
capturing a first image of the plain bearing shell in a first mode, wherein no external compression stress in a circumference direction of the plain bearing shell is formed;
generating plain bearing data based on the first captured image;

maintaining housing reference data comprising at least diameter information of a bore for receiving the plain bearing shell; and determining crush height of the plain bearing shell based on the plain bearing data and the housing reference data.

Different non-binding example aspects and embodiments have been illustrated in the foregoing. The embodiments in the foregoing are used merely to explain selected aspects or steps that may be utilized in implementations. Some embodiments may be presented only with reference to certain example aspects. It should be appreciated that corresponding embodiments may apply to other example aspects as well.

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

An example embodiment and its potential advantages are understood by referring to FIGS. 1 through 10 of the drawings. In this document, like reference signs denote like parts or steps.

Figure 1:
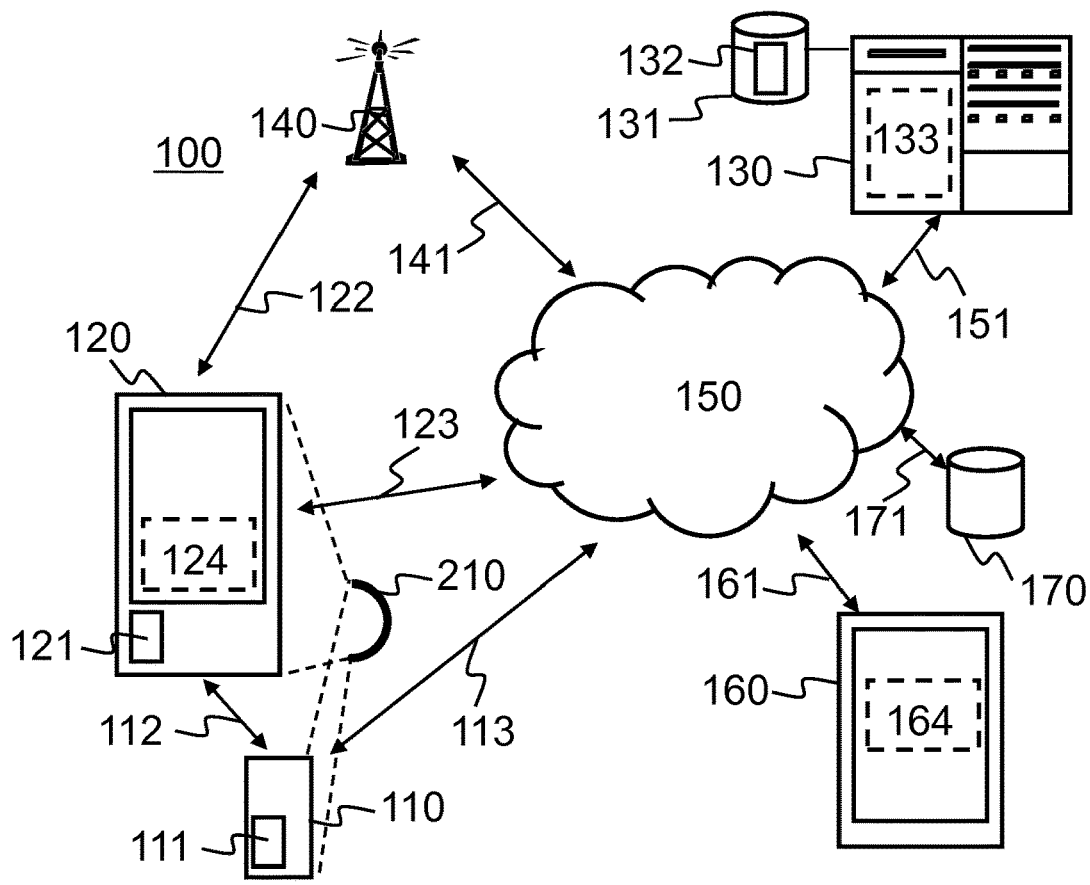
FIG. 1 shows a schematic drawing of a system of an example embodiment.

FIG. 1 shows a schematic picture of a system 100 according to an example embodiment.

The system comprises a client device 120 that may comprise a multimedia device, a mobile phone, an Internet tablet or a laptop computer, for example. The client device 120 is capable of downloading and locally executing software program code. The software program code may be a proprietary client application 124 of a service whose server application 133 is running on the server apparatus 130 of the system 100. The client device 120 may comprise a metadata element 121 for creating data usable as metadata relating to control input of the proprietary application 124, such as optical plain bearing crush height measurement application, dynamic crush height parameter adjustment application, housing reference data measurement application, bearing shell measurement application, or application using the crush height as input data.

The metadata element 121 may comprise at least one of the following: a microphone, a sensor device, an optical detection device, a temperature sensor, and a positioning device for determining the current location of the apparatus 120.

In an embodiment, the client device 120 is configured to be connectable to a wireless communication network 140 over a wireless connection 122. The wireless connection 122 may comprise a mobile cellular network or a wireless local area network (WLAN), for example. The wireless communication network 140 may be connected to a public data communication network 150, for example to the Internet, over a data connection 141. The proprietary application 124 may be operable also in offline mode and there is no need to have online connection over the network to the server 130, 131 all the time. In offline mode, the client device 120 may store application related data to cache memory and update the data to the server 130, 131 once getting the online access or at least one of the subject user, the proprietary application or the server application triggers or requests to synchronize or upload data, for example.

In an embodiment, the system 100 comprises a sensor device 110 configured to be capable of capturing crush height measurement related data. The sensor device 110 may comprise storage 111 for the crush height measurement related data. The storage 111 may comprise a flash memory card, for example. The sensor device 110 is configured to be connectable to the client device 120 over a data connection 112. The data connection 112 may be a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example.

The sensor device 110 is configured to send captured data over the data connection 112 to the client device 120. Such transmittal may be initiated by a user of the sensor device 110, by a user of the client device 120, or automatically based on settings. Such settings may comprise for example time of the day, amount of newly captured crush height measurement related data or existence of the data connection 112 for the sensor device 110.

In an embodiment, the proprietary application 124 may comprise a plurality of client applications. A first client application may comprise a crush height measurement application according to embodiments disclosed. A second client application may comprise a dynamic crush height parameter adjustment application.

In an embodiment, the system 100 comprises a server apparatus 130, which comprises a storage device 131 for storing bore or plain bearing shell detection related information, such as dynamic glint pattern data, settings, user profile information, environmental information of the apparatus 110, 120, event logs and metadata received over a data connection 151, user profile information of users, credentials, history information of users, client software application data and server software application data, for example.

In an embodiment, the system 100 may further comprise other user apparatuses 160, connected to the network 150 over connection 161, wherein tasks relating to the service system may be processed. The user apparatus 160 may comprise a peer apparatus for augmented reality (AR) related application with the user apparatus 120, for example.

Different apparatuses 110, 120, 130, 160, 170 may provide crush height measurement related information to be maintained in the service system 100. The information may be maintained as a collaborative record 132 within the server apparatus 130, 131. The collaborative record 132 may comprise any crush height measurement related information provided by different users, the service system or sensors, for example.

Furthermore, the coordinator of an apparatus 160 may administer settings, crush height measurement information and user data. The system service 130, 131 and its server application 133 may receive user or crush height measurement related data generated by the proprietary application 124 of the client device 120 as input and process the received data.

In an embodiment, a server apparatus 130 maintains the service system data, such as crush height measurement related records. Each record may be identified using a unique identifier. Furthermore, an identifier for a subject user, a bearing shell, a housing, an engine apparatus, a marine vessel or a power plant may be used to identify each item, respectively. The subject user identifier may comprise, for example a unique number, iris detection information, string or an e-mail address, for example. In general, the identifier must be unique.

Information relating to crush height measurement related data may be transmitted to the server 130 from a plurality of apparatuses 110, 120, 160 over the network 150. Eventually, the received service data is maintained, by an operator, at the server 130 comprising storage device 131, wherein the data being available for users or apparatuses having access to that particular record. Furthermore, metadata associated with the service data may also be stored in the server 130 or storage device 131, such as material information, temperature information, crush height related information, location information, time information, or a device identifier, for example.

In an embodiment, crush height measurement related data may be transferred to a server apparatus 130 over different paths. A first path may comprise sending data captured by a proprietary application (e.g. a crush height measurement client application) of a client device 120 over a wireless communication network 122, 140, 141 and public data communication network 150, 151 to the server apparatus 130. A second path may comprise sending data captured by a default application of a client device 120 over a wireless communication network 122, 140, 141 and public data communication network 150, 151 to the server apparatus 130. A third path may comprise sending data captured by a sensor device 110 (such as apparatus attached sensor or imaging device) to the client device 120 over connection 112 and therefrom over a wireless communication network 122, 140, 141 and public data communication network 150, 151 to the server apparatus 130. A fourth path may comprise sending data captured by the device 110 to a computer apparatus 120 and therefrom over a data connection 123 and the public data communication network 150, 151 to the server apparatus 130.

In an embodiment, the proprietary application in the client device 120 may be a client application of a service whose server application is running on the server apparatus 130 of the system 100. The proprietary application may capture the data for the first path. Also, metadata for the captured multimedia may be retrieved by the proprietary application from the metadata elements 121 of the client device 120. For the second path, the data captured by the default application may be imported to the proprietary application before transmitting to the server apparatus 130. The proprietary application may check the data and extract and apply metadata for the data. For the third path, the data may be captured by the external device 110 and transmitted to the proprietary application of the client device 120 for sending to the server apparatus 130. The proprietary application may check the data and extract and apply metadata for the multimedia data. A user may provide additional metadata using the client device 120. For the fourth path, the data may be captured by the external device 110 and transmitted to a communication application of a computer apparatus 120.

In an embodiment, a proprietary or client application 164 in the user apparatus 160 (e.g. administrator apparatus) may be a peer or an administrator application of a service whose server application is running on the server apparatus 130 of the system 100.

In an embodiment, the sensor device 110 may comprise an engine apparatus connected device communicating with the apparatus 120 over a local connection 112. The local connection 112 may comprise, for example, at least one of the Bluetooth, Radio Frequency Identification (RF-ID), near field communication (NFC) or other wireless non-cellular connection. The wireless non-cellular connection may comprise industrial, scientific and medical (ISM) radio bands that are radio bands (portions of the radio spectrum) reserved internationally for the use of radio frequency (RF) energy for industrial, scientific and medical purposes, for example. The local connection 112 may also comprise non-RF connection, such as Light Fidelity (Li-Fi), for example. Alternatively, the sensor device 110 may be comprised by the apparatus 120, as illustrated by an integrated apparatus 120-121.

In an embodiment, the sensor device 110 may be paired with the client device 120. Pairing may be based on device identifiers of the devices 110, 120 and pairing information may be maintained within the subject user profile associated with the subject.

Furthermore, the sensor device 110 may be connected to the network 150 over a data connection 113 corresponding to connection 123, for example.

In an embodiment, a communication interface module of the device 120 may comprise location modules for tracking location of the portable apparatus 120. Such location modules may comprise a module for providing a connection to satellite based global positioning system (e.g. GPS, not shown), a module for cellular based positioning system, a module for wireless non-cellular positioning system (e.g. Wi-Fi) or a module for hybrid positioning system, for example.

In an embodiment, the client device 120 may be connected over a wireless or wired connection to a wide area network 150, such as Internet. Router apparatuses (not shown) may be used for providing the access to a wide area network 150. The access may comprise cellular or non-cellular connection.

In an embodiment, a proprietary application 124, such as a crush height measurement application, in the device 120 may be a client application of a service whose server application is running on the server apparatus 130 of the system 100. The proprietary application 124 may capture the input data for the service and provide the output data from the service.

In an embodiment, at least parts of the apparatus 120 and/or the device 110 may be implemented as a chipset that comprises required communication interface, memory, program code and processor to perform the control algorithms for the dynamic crush height measurement.

The server 130 may also provide a cloud service for the portable device 120 data. Optionally, further apparatuses may be added, such as peripheral devices for maintaining, providing or processing the portable device 120 data and communication devices for connecting the peripheral devices to the system 100.

In an embodiment, the system 100 may further comprise an external database 170. The external database 170 may be accessible to the network 150 over connection 171. The database 170 may have corresponding structure as the server apparatus 130, 131, for example.

In an embodiment, the apparatus 110, 120 is exchangably attached as testing apparatus to a second apparatus, the second apparatus being an engine apparatus, for example a marine vessel engine or a power plant engine.

In an embodiment, the apparatus 120 may receive settings, from a cloud server 130, comprising at least one of the following: environmental data; environmental reference data, plain bearing reference data; plain bearing data; housing data; and housing reference data. Corresponding data at the apparatus may then be adjusted based on the settings.

Furthermore, the determined crush height of the plain bearing shell may be transmitted to a cloud server apparatus.

In an embodiment, the apparatus 110, 120 is configured to determine crush height of a plain bearing shell 210, wherein the apparatus 110, 120 is configured to capture a first image of the plain bearing shell 210 in a first mode, wherein no external compression stress in a circumference direction of the plain bearing shell 210 is formed and to generate plain bearing data based on the first captured image. Housing reference data is maintained comprising at least diameter information of a bore for receiving the plain bearing shell 210, and crush height of the plain bearing shell 210 is determined based on the plain bearing data and the housing reference data.

Furthermore, the apparatus 110, 120 is configured to capture a second image of another plain bearing shell 210 in a first mode, wherein no external compression stress in a circumference direction of the second plain bearing shell 210 is formed and to generate plain bearing data based on the second captured image. Housing reference data is maintained comprising at least diameter information of a bore for receiving the plain bearing shell 210, and crush height of the second plain bearing shell is determined based on the plain bearing data and the housing reference data.

As a result, the plain bearing data comprises data for a plurality of optically measured plain bearing shells 210. The housing reference data comprises data for at least one bore for receiving the plain bearing shell 210.

The plain bearing data comprises at least one of the following: a circumferential length of the bearing shell; a free spread of the bearing shell; a bearing shell form; and a thickness of the plain bearing shell.

A client software application 124, 164, 133 running at apparatus 120, 160, 130 may be configured to first determine housing reference data for the housing and associated bore the bearing shell 210 is allocated for. Second, the client software application may receive bore characteristics based on the housing reference data. Third, the client software application determines crush height of the first plain bearing shell 210 based on the plain bearing data associated with the first plain bearing shell 210 and the housing reference data. Fourth, the client software application determines crush height of the second plain bearing shell based on the plain bearing data associated with the second plain bearing shell. Fifth, the client software application selects the second plain bearing shell to be paired with the first plain bearing shell based on the plain bearing data associated with the first and the second plain bearing shells and the housing reference data. Thus, optimal pairing of the plain bearing shells 210 may be determined automatically. For example, if the first plain bearing shell 210 is slightly too long in view of circumferential length of the bearing, the second plain bearing shell may be selected as slightly shorter in view of circumferential length of the bearing. The resulting combination of the plain bearing shells 210 is still in acceptable in view of required crush height for the bore and bearing assembly.

The apparatus 120, 160, 130 may be configured to determine a plurality of parameters based on optical measurement, such as: a circumferential length of the bearing; a free spread of the bearing; a bearing shell form; and a thickness of the bearing. Each parameter may be determined a weight value and a range for the determined parameters where the plain bearing shell is acceptable as a single plain bearing shell 210 and as combination with another plain bearing shell to provide weighted parameters. The pairing of the plain bearing shells 210 for certain assembly and bore may be optimized then by selecting the optimal plain bearing shells based on the weighted parameters, for example.

Figure 2:
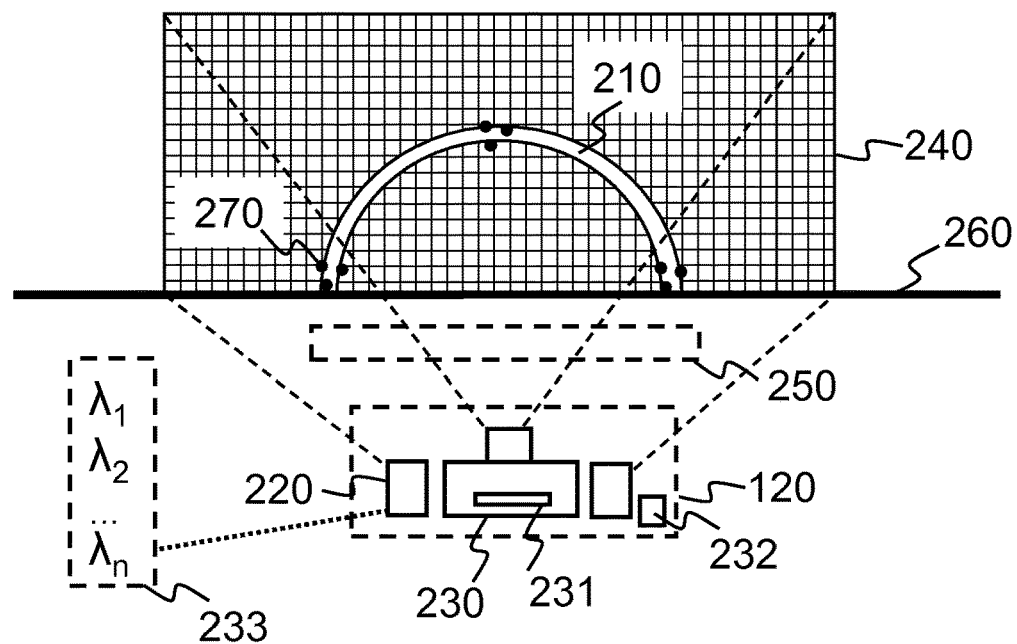
FIG. 2 shows a schematic drawing of an arrangement for determining crush height of a plain bearing shell of an example embodiment.

FIG. 2 shows a schematic drawing of an arrangement for determining crush height of a plain bearing shell of an example embodiment.

An apparatus 120 is configured for determining crush height of a plain bearing shell 210, comprising a light source 220 for forming illuminating light to the plain bearing shell 210 and a sensor device 230 configured to capture an image.

In an embodiment, a measurement background element 240 may be used. The measurement background element 240 may be configured to comprise measurement patterns for improving the image capturing by the sensor 230 and especially improving accuracy of the plain bearing related data generated based on the image, such as dimensions of the plain bearing shell 210.

A first image of the plain bearing shell 210 may be captured in a first mode, wherein no external compression stress in a circumference direction of the plain bearing shell 210 is formed, as shown in FIG. 2, and plain bearing data may be generated based on the first captured image. Outside circumferential length of the plain bearing shell may be determined based on the first captured image; and the plain bearing data may be determined to comprise the outside circumferential length of the plain bearing shell.

In an embodiment, housing (not shown in FIG. 2) reference data comprising at least diameter information of a bore for receiving the plain bearing shell 210 is maintained within the system, and crush height of the plain bearing shell 210 may be determined based on the plain bearing data and the housing reference data.

In an embodiment, the sensor device 230 may generate sensor data that may be configured to identify the material of the plain bearing shell 210. Such identification may be based on reflected wavelengths from the plain bearing shell 210 by using different wavelengths 233 of at least one light source 220 used. Material information may be used for crush height determination. Sensor data and/or material information may also be associated with or comprised by the plain bearing data. Material information of the plain bearing shell may be determined based on the captured first image and the plain bearing reference data; and coefficient of thermal expansion for the plain bearing shell may be determined based on the material information.

In an embodiment, plain bearing reference data comprising material information of at least one plain bearing shell may be maintained within the system 100. Furthermore, housing reference data comprising material information of at least one housing with the bore for receiving the plain bearing shell may be maintained within the system. The material information is configured to determine coefficient of thermal expansion for at least one of the plain bearing shell and the housing. Determination may be done by the client apparatus 120 or at the cloud server apparatus 130, for example.

In an embodiment, environmental data, such as temperature information may be measured by at least one sensor device (not shown in FIG. 2 but see e.g. sensor device 460 of FIG. 4) either installed to the apparatus 110, 120 or measured by a portable sensor device operated by a service user, for example. The environmental data comprising current measurement temperature and plain bearing shell operating temperature may be maintained within the system.

In an embodiment, a second image of the plain bearing shell 210 may be captured in a second mode, wherein the plain bearing shell 210 is fitted to the bore of the housing (not shown in FIG. 2 but see FIG. 8) and external compression stress in a circumference direction of the plain bearing shell 210 is formed. The housing reference data may be generated based on the second image. Material information of the housing may be determined based on the captured second image and the housing reference data, and coefficient of thermal expansion determined for the housing based on the material information.

Light source(s) 220 and the sensor device 230 may be arranged in same housing of the apparatus 120 as integrated apparatus or arranged separately but operationally connected with each other.

In an embodiment, freeform optical elements 250 may be configured to guide and form the illuminating light from the light source 220 to the plain bearing shell 210 and back to the sensor device 230 with a sensor 231, wherein the illuminating light may be configured to be dynamically adjustable to generate a dynamic light setting.

In an embodiment, dynamic adjusting of the illuminating light may be performed using spectral power distribution of the light source 220. Intensity of the light source 220 can be manipulated and spectral power distribution can be changed by electric current/voltage levels that are obtained for a plain bearing shell profile based on settings. The settings may be determined in a setup phase based on plain bearing shell scanning or environmental light profile detection, for example. The spectral power distribution of the light source 220 may be controlled based on current/voltage/modulation (PWM). Alternative constant control modes may comprise, for example, constant voltage (CV), and constant current (CC).

In embodiment, PWM mode may be used for improving light adjustment or sensor device operation. For example, power of the light source may be increased but shorter signals being made so that the total exposure is still within acceptable limits. PWM may also be applied to decrease energy consumption.

In an embodiment, characteristic data of the dynamic light pattern provided by the light source 220 (e.g. intensity, spectral power distribution, pattern formation) may be adjusted based on the settings. The settings may comprise at least one of the following: environmental information of the apparatus, plain bearing shell profile, housing profile, and user profile information.

The user profile information may comprise, for example, sensor optical properties and transmitter's optimized power distribution data. The user profile information may also comprise spectral properties of the imaging sensor after adaptation for detecting the light in specific range (infrared or the range above the visible range of the user, for example).

In an embodiment, the light source 220 may comprise several spectral bands that can be turned ON or OFF with different intensities and combinations. Such combination is generated by an algorithm based on input data (sensor characteristics data such as spectral optical properties, and detected distance of the measured element from the imaging sensor, for example. Detected distance can be used for adjusting pattern (its distribution), light intensity, or focusing camera, for example. Thus, an adjustable (dynamic) light pattern may be obtained.

In an embodiment, the dynamic spectral power distribution may be adjusted so that the light source (one or several transmitters) is capable to provide several spectral bands that may be used for crush length determination to produce optimized spectral distribution to enhance performance.

Optimized spectral power distribution is generated by selecting an optimal number of spectral bands at optimal intensity. Adjustable illumination together with free form optical elements enables generating of dynamic optimized light patterns.

The freeform optics 250 is configured to guide and form illumination of the plain bearing shell 210. Even a formed shape of light glint pattern 270 may be generated on the plain bearing shell 210 and possible background 240. Such glint pattern 270 can be adjusted and assist in detecting physical dimensions of the plain bearing shell 210. One source of illumination 220 may be used and the light can be shaped and divided using the optical elements 250. Thus, the radiation reaching the sensor device 230 and sensor 231 is easily controlled and kept within standard limits. The unique optimized glint pattern 270 simplifies and enhances the tracking algorithm and make the solution more robust and consume less energy. Intensity, spectral power distribution and position of a glint pattern 270 may be dynamically adjusted by a control algorithm based on settings, even automatically without user interaction. Coordinates can be extracted and the relationship between the dimensions of the plain bearing shell 210, the apparatus 120 (with possible optics 250) and the glint pattern(s) 270 can be determined for determining plain bearing shell 210 related data. Among other methods, edge detection techniques can be applied to segment the detected image into different required components for analysis. Different edge detecting steps with wide range of parameters can be effectively used for detecting the glint coordinates and plain bearing shell parameters, such as shell dimensions. Furthermore, an adaptive lighting of the light source 220 may be provided to create optimal spectral illumination and power for illumination. The adaptivity takes into account surrounding light conditions and properties of the sensor device 230. The illumination by the light source 220 can be adapted to each plain bearing shell 210 and/or sensor device 230 in order to provide the best final performance. Settings are stored and can be loaded anytime. The illumination may also be optimized with sensitivity of an imaging sensor 230. The illumination may also be optimized with sensitivity of the sensor after adaptation. That is different since it includes information about the cut-off filter, for example.

In an embodiment, a carrier device 260 may be configured to automatically transport plain bearing shell 210 for optical measurement by the apparatus 120. The carrier device 260 may further be configured to tilt the measured bearing shell 210 about different axis, for example. Alternatively, the apparatus 120 (and possible optical elements 250) is movably arranged in view of the bearing shell 210 so that optical measurement can be carried out from various angles.

The illustrated apparatus 120 fits also well for portable, even wearable non-tethered devices (e.g. helmet of installation/service engineer operating on-site), where energy consumption is important and surrounding incident light conditions are changing.

In an embodiment, a wearable apparatus 120 may be used to capture image on-site of a bore of the housing where the plain bearing shell is about to be installed later on. Based on the captured image, fingerprint data of the housing and the bore may be determined in analogous way as described for the plain bearing shell measuring. The fingerprint data may be comprised by the housing reference data and used as an input for determining crush height for the plain bearing shell as well as selecting the optimal pairing for second plain bearing shell. The bore may be measured, and the fingerprint data updated periodically to improve optimal selection of the plain bearing shell and crush height of the shell. The captured image may correspond otherwise to the second image that is captured with the plain bearing shell placed to the bore, as discussed in relating to FIGS. 1-2, but the captured image may be taken without the plain bearing shell in place.

In an embodiment, the light source 220 may comprise a plurality of light transmitters, at least one of them being configured to emit light in different spectral bands 233 (as illustrated by different wavelengths $\lambda_1$-$\lambda_n$), and spectral power distribution of at least one transmitter may be adjusted based on the settings. At least one of the light transmitters may be configured to emit light with wavelength between 800-2600 nm.

Intensity of each transmitter can be configured separately.

A light transmitter may comprise, for example, a light emitting diode (LED), a laser, or a laser diode.

Emitted light of the light transmitter may be selected so that the emitted light is not visible for an observer eye. In theory visible range is somewhere between 380-780 nm however there might be lights of 730 nm that people cannot see and can be also used.

In an embodiment, a custom RGB camera may be used for detection that is modified to also detect near-infrared (NIR) light with visible (VIS) cut off filter coupled.

In an embodiment, the apparatus 120 comprises a sensor device with a sensor 231, such as a photodetector, having a storage element operable to output a sequence of reset and measurement values; and a configurable sampler coupled to the storage element to sample the sequence of reset and measurement values within an exposure interval, the exposure interval encompassing a plurality of measurement intervals, the sampler supporting sample modes, including: a first sample mode operable to produce a first output derived from one of the reset values and an adjacent measurement value, the first sample mode operating in a first of the measurement intervals; a second sample mode operable to produce a second output derived from one of the measurement values and an adjacent reset value, the second sample mode operating in a second of the measurement intervals; and a transition mode operable to switch between the first and second sample modes responsive to at least one of the first and second outputs, the transition between the first and second sample modes occurring within the exposure interval.

The sensor device 230 supports different operational modes that give different trade-offs between noise performance and dynamic range. In the first mode, correlated double sampling (CDS), amplifier (not shown) resets photodetector 231 after each measurement interval. A pixel's intensity is measured with reference to that pixel's reset value, which provides a degree of noise immunity. In the second mode, non-correlated double sampling (NCDS), photodetector 231 allows charge to accumulate on photodiode of the sensor 231 over multiple measurement intervals during an exposure. As in CDS, a pixel's intensity is measured with reference to that pixel's reset value. NCDS pixel measurements are subject to different noise than the corresponding reset values, however, making NCDS measurements more sensitive to reset noise. The third mode, direct sampling (DS), is relatively simple but generally affords the least noise immunity of the three modes. In direct sampling, pixel intensity is measured with respect to a reference that is not derived from the pixel. Direct sampling can be accomplished for each measurement interval within an exposure interval or can be used when integrating charge over multiple measurement intervals.

In an embodiment, the apparatus 120 is configured to determine used operational mode based on at least one of the following: ambient light information provided by an ambient light sensor 232, used wavelength(s) 233, and reference data maintained for the measured plain bearing shell 210.

Each mode has characteristics and advantages depending on a given lighting condition. Pixel sensor 231 advantageously allows the host processor to transition among operational modes during or between exposure intervals, and thereby adapt to lighting conditions. Mode selection can be pixel specific or can be common to one or more groups of pixels in an array.

Figure 3:
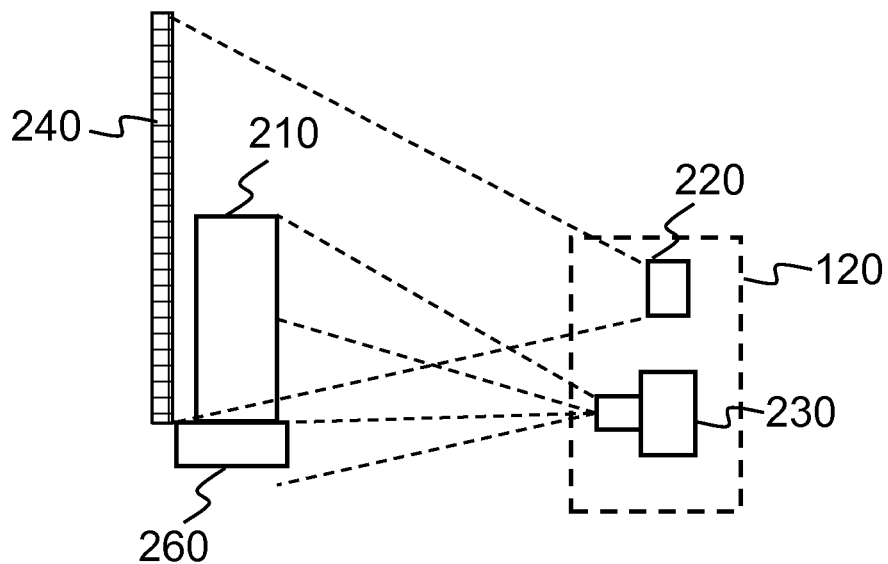
FIG. 3 shows a schematic drawing of a determining crush height of a plain bearing shell of an example embodiment, from different angle compared to FIG. 2.

FIG. 3 shows a schematic drawing of a determining crush height of a plain bearing shell of an example embodiment, from a different angle compared to FIG. 2.

An apparatus 120 is configured for determining crush height of a plain bearing shell 210, comprising a light source 220 for forming illuminating light to the plain bearing shell 210 and a sensor device 230 configured to capture an image.

In an embodiment, a measurement background element 240 may be used. The measurement background element 240 may be configured to comprise measurement patterns for improving the image capturing of the sensor device 230 and especially the plain bearing related data generated based on the image, such as dimensions of the plain bearing shell 210.

In an embodiment, freeform optics may be used to adjust the light to create a light pattern, e.g. a glint pattern, on the element 210, 240. Light may be controlled by an algorithm, e.g. via a current driver that then controls the light transmitter(s) to generate light with different SPD (spectral power distribution) unique for each element, sensor or their combination.

A number of light transmitters 220 or position of freeform fibres create pattern itself, thus in some cases the pattern can be shaped by the fibres/transmitters, however then the pattern is not necessarily dynamic. However, even such a static pattern may be adjusted by arranging an additional lens that is configured to focus the pattern on the target element 210, 240.

The apparatus may comprise freeform optical elements within light path between the sensor device and the light source and comprise at least one of the following: an optical lens and optical fibers.

An apparatus 120 is shown for determining crush height information based on optical measurement. The apparatus 120 illustrates the effective feature that enables an easy attachment to manufacturing site of the bearing, installation site of the bearing, service site of an engine or even as portable or user-wearable apparatus attached to a helmet or AR/VR glasses, for example. Light emitted by a light source 220 is directed to the measured bearing 210 and reflected back to the sensor device 230, such as a camera for example. Background element's reference information may be used by the algorithm to define relevant dimension data related to the bearing 210.

In an embodiment, input data for calibration of the crush height detection apparatus 120 and the control algorithm may be processed. A light source 220 may be calibrated in order to obtain input data for the algorithm that controls the light source 220 to get optimized spectral power distribution when operating the detection apparatus 120. For example, a unique calibration of the apparatus 120 may comprise scanning the reference background element 240 through all spectral bands included into the light source 220 ($\lambda 1$, $\lambda 2, \ldots \lambda n$). Scanning may comprise steps to turn ON $\lambda 1$ and take image by the imaging sensor device 230, then move to $\lambda 2$ and again acquire image. This may be repeated for all spectral bands. An image is captured for each spectral band (images may be captured very fast without any user being noticed of any spectral band changes). Thus, it is provided a spectral device solution inside the apparatus 120. Such approach delivers spectral and spatial signatures that can result in so called spectral cube, typically used in multispectral imaging. Captured set of images is dependent of the light source bands ($\lambda 1, \lambda 2, \ldots \lambda n$) and imaging sensor device's and sensor's spectral properties. Therefore, spectral properties for both the imaging sensor device 230 and the light transmitter 220 spectral bands may be utilized if available before starting the calibration. However, this approach will work also without preliminary knowledge of the imaging sensor device 230 or without exact data related to the spectral bands emitted from the transmitters 220.

Next, the algorithm may detect e.g., borderlines, contours or other features of the detected bearing element 210 and/or the background element 240 and furthermore the contrast between selected features may be compared. Knowing the physical distances between the apparatus 120, the background element 240 and the bearing element 210, the algorithm may determine dimensions for the bearing element 210. Contrast is used here, however other properties of the image like brightness, dynamic range, high dynamic range, etc. can be also compared. The image quality index or several indexes are set as default by the calibration software or by a user.

In next step of the algorithm, depending on features of the interest, the best spectral bands may be determined. At least one image is determined to result with better contrast between the bearing element 210 and the background element 240 to compare with other images. It may be that a plurality of images is selected based on contrast comparison.

Next, the algorithm may determine contrast between the selected (best) images and defines the contrast index. Contrast index is then converted to the intensity of the spectral band in the transmitter. Conversion between contrast values and spectral band intensity can be linear or nonlinear, wherein also optimization methods could be involved.

The indexing step and step of taking reference images for each spectral band could be repeated within the algorithm in case the algorithm cannot detect some features (features can be set automatically or manually), for example. Furthermore, after conversion step, additional process steps may be included e.g., comparison of the image contrast resulting from the combination of spectral bands in conversion against each image captured for a single band. In case determined results are not satisfactory enough to compare with reference images, the calibration steps may be repeated, or the best single band may be used.

As a result, if all steps of the calibration algorithm are performed correctly, the image obtained while the bearing element 210 being illuminated based on calibration data has an improved contrast between dedicated pair of features for e.g. the bearing element 210 and the background element 240.

Such calibration data provides input data for control algorithm steps that generate information about intensity level of each spectral band to be used (e.g., $\lambda 1 \rightarrow 100\%$, $\lambda 2 \rightarrow 2\%$, $\lambda 3 \rightarrow 0\%$, $\lambda 4 \rightarrow 22\%$). Data can be determined for each bearing type or size, stored and reused. Such data can be also obtained for specific group of bearings with different optical properties etc. and provided through the cloud service 130-133, 150-151.

Using the calibration procedure, it is possible to obtain optical properties of the bearing element 210 to get characteristic information of which spectral bands should be turned ON/OFF and at what intensity level when operating the crush height detection. It is possible to adjust and continuously update settings based on the calibration. It is possible to maintain reference data for different bearing types of different materials so that each bearing type and material may be identified automatically after the calibration and/or learning phase.

An optimized spectral power distribution (SPD) for each bearing optical property may be determined from the previous research results so a new bearing may just provide selection information for the type of the bearing and optimized spectral power distribution (SPD) data is loaded for the detection apparatus 120.

Spectral power distribution (SPD) can also be made manually adjustable by the user to be easily controlled and to give the best results.

In an embodiment, in relation to the calibration algorithm steps discussed above, the illumination of the element 210, 240 may contain e.g. 5-spectral bands (e.g. between 600-1200 nm). The wavelength peak and the spectral distribution for each emitted band is beforehand defined/measured. The peaks may be, for example, 650 nm, 750 nm, 900 nm, 1000 nm, 1150 nm. A set of images is captured in the same way as explained above.

Each spectral band $\lambda 1$-$\lambda 5$ (order of spectral band to be ON does not matter) is turned ON and the images are captured for each spectral band $\lambda 1$-$\lambda 5$. Since the intensity and the peak wavelength of each spectral band are known, the spectral properties of the imaged object can be determined. This procedure generates information within the algorithm about amount of the reflected light from the object in the field of view of the imaging sensor device. Information of the sensitivity of the sensor device is also relevant to obtain correct results.

A further algorithm step generates calculated distances of reflectance information (e.g. between sensor device 230 (and sensor 231) and the bearing element 210 with different spectral bands, and between sensor device 230 and the background element 240 with different spectral bands) that provide the algorithm input information about optical properties of at least one selected feature (features can be detected automatically or manually by operating user). In case of the bearing element 210 in view of the reference background element 240, spectral properties of the selected points are analysed and based on the spectral properties of two or more features are calculated, the algorithm generates information about the properties on selected features for the spectral bands $\lambda 1$-$\lambda 5$.

For example, distance corresponding to the reflectivity of the light for spectral band (λ1-λ5) may be correlated with the intensity of the spectral band that should be used. However, there are many other methods in order to differentiate two or more spectral features that can be used.

After generating the intensity list for spectral bands λ1-λ5, the optimized illumination may be used for crush height detection.

The produced illumination can be validated against previously obtained set of images for each λ1-λ5 spectral band. In case contrast between features (or between contrast/image qualities of the total image) is not improved one of the λ1-λ5 spectral bands providing the best results may be selected.

In an embodiment, a multi-wavelength illumination using at least one dynamic light source comprising at least one light transmitter may be used. The multi-wavelength illumination may be used for both acquiring spectral properties of the target element and then to use the acquired data as an input for the control algorithm that results in optimized illumination for contrast/image enhancement.

No matter contrast is used here, other properties of the image like brightness, dynamic range, high dynamic range, etc., may also be included into the algorithm and can be optimized accordingly to the settings.

In an embodiment, in relation to the calibration algorithm steps discussed above, reference data for calibration may be provided.

In an embodiment, for the calibration phase, the user may be requested to use standard reference caps or plates for suppressing the image imperfections and to specify the intensity and the light distribution all over the field of view of the sensor device 230. The plate may be arranged, for example, in front of the detection apparatus 120 or the sensor device 230, depending on the implementation. The plates may comprise, for example, black plate and white plate that may be exchangeably arranged as standard reference for camera/image calibration.

In an embodiment, instead of a plate, the background element 240 may be formed appropriately with pre-defined colour areas so that the camera is capable of detecting them as a reference.

Standard reference plate(s) could be used for reference data measurements before the steps disclosed above for the calibration algorithm phase.

In an embodiment, the carrier device 260 may also be configured to measure weight of the bearing shell 210 when automatically transporting the plain bearing shell 210 for optical measurement by the apparatus 120. The weight information may be used and associated to the plain bearing data.

Figure 4:
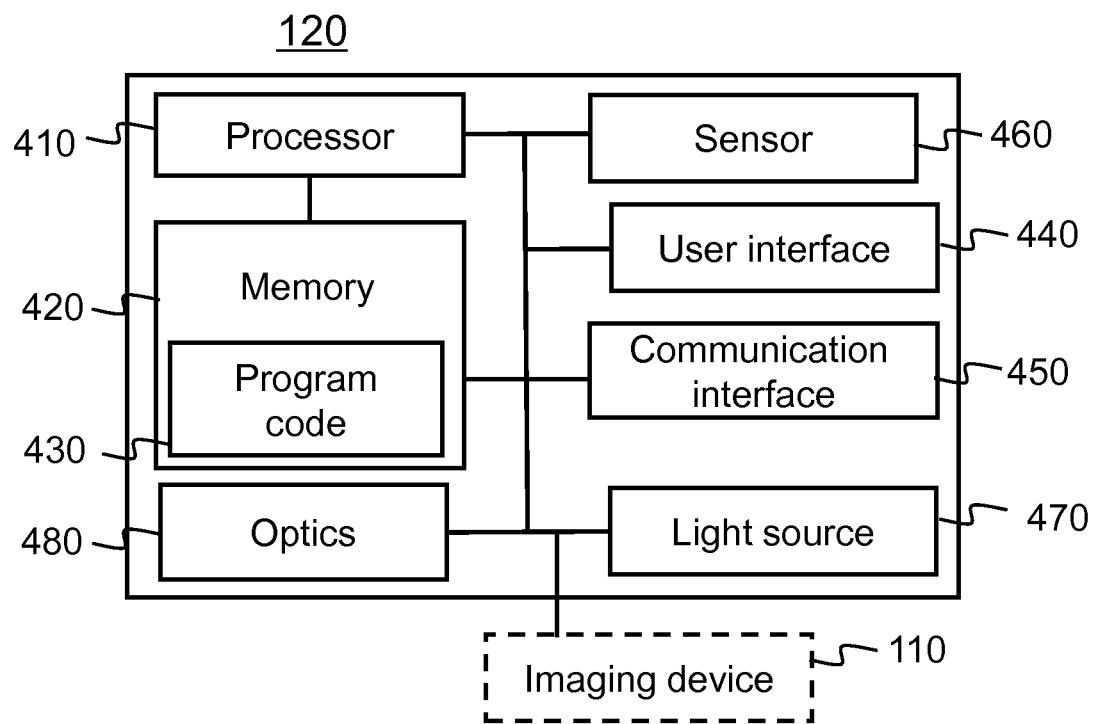
FIG. 4 shows a block diagram of an apparatus, such as a client device of an example embodiment.

FIG. 4 shows a block diagram of an apparatus, such as a client device 120 of an example embodiment. In an embodiment, a sensor device/sensor 460 may be implemented as a separate device 110 communicating via the communication interface 450 with the client device 120, or as an integrated sensor device/sensor 460 within the device 120. The user interface 440 may be implemented also in another device connected via a communication interface 450 to the device 120. Such device may comprise a mobile phone, a smart phone, or a tablet, for example. In an embodiment, the device 120 may communicate with a plurality of sensor devices/sensors 460, both internal and external sensor devices/sensors, and of a plurality of users. In an embodiment, the sensor device/sensor 460 may also comprise a temperature sensor or a camera for capturing multimedia data to be processed on-site or submitted to the server apparatus 130, 131 as user data, or plain bearing detection related data, for example.

The general structure of the device 120 comprises a user interface 440, a communication interface 450, a processor 410, and a memory 420 coupled to the processor 410. The device 120 further comprises software 430 stored in the memory 420 and operable to be loaded into and executed in the processor 410. The software 430 may comprise one or more software modules and can be in the form of a computer program product. Not all elements of FIG. 4 are necessary but optional for the portable apparatus 120, such as the external sensor device 110 or the user interface 440. Optics 480 may be configured to guide reflected light beams back from the detected plain bearing shell to the sensor, or for guiding the illuminating light (e.g. glint patterns) from the light source to the plain bearing shell, for example. Light source 470 may be included in the device 120 or arranged as separate device.

In an embodiment, a proprietary application 124 of FIG. 1, such as a plain bearing crush height detection application, is a computer-implemented client software application 430 to record data.

The processor 410 may be, e.g., a central processing unit (CPU), a microprocessor, a digital signal processor (DSP), a graphics processing unit, or the like. FIG. 4 shows one processor 410, but the device 120 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The device 120 may comprise a plurality of memories. The memory 420 may be constructed as a part of the device 120 or it may be inserted into a slot, port, or the like of the device 120 by a user. The memory 420 may serve the sole purpose of storing data, or it may be constructed as a part of an apparatus serving other purposes, such as processing data.

The user interface 440 may comprise circuitry for receiving input from a user of the device 120, e.g., via a keyboard, a touchpad, a motion sensor, a touch-screen of the device 120, speech recognition circuitry, gesture recognition circuitry or an accessory device, such as a headset or a remote controller, for example. Furthermore, the user interface 440 may comprise circuitry for providing output for the user via a display, a speaker, a touch-sensitive display or a tactile feedback device, for example.

In an embodiment, a user may speak during the plain bearing detection and the speech is automatically converted to feedback information for the system. Thus, feedback is always up-to-date and accurate.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, LTE (Long Term Evolution) or 5G radio module. As the radio technologies are evolving and new replacing systems being developed, the new developed technologies can be used for the communication interface module 450 in view of different embodiments disclosed. The communication interface module 450 may also comprise non-RF connection, such as Light Fidelity (Li-Fi). The wired interface may comprise such as universal serial bus (USB), for example. The communication interface module 450 may be integrated into the device 120, or into an adapter, card or the like that may be inserted into a suitable slot or port of the device 120. The communication interface module 450 may support one radio interface technology or a plurality of technologies. The communication interface module 350 may support one wired interface technology or a plurality of technologies. The device 120 may comprise a plurality of communication interface modules 450.

In an embodiment, the communication interface module 450 may comprise location modules for tracking location of the device 120. Such location modules may comprise a module for satellite based global positioning system (e.g. GPS), a module for cellular based positioning system, a module for wireless non-cellular positioning system (e.g. Wi-Fi) or a module for hybrid positioning system, for example.

In an embodiment, the communication interface 450 with a satellite based global positioning system (e.g. GPS) may detect altitude of the user to provide an estimate of thinness of air.

A skilled person appreciates that in addition to the elements shown in FIG. 4, the device 120 may comprise other elements, such as microphones, speakers, sensors, cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the client device 120 may comprise a disposable or rechargeable battery (not shown) for powering when external power if external power supply is not available.

In an embodiment, the algorithm(s) and computer program codes controlling illumination/dynamic patterns/glint detection can be arranged within a chip/chipset that may be included to client device 120.

In an embodiment, the client device 120 comprises speech or gesture recognition means. Using these means, a predefined phrase or a gesture may be recognized from the speech or the gesture and translated into control information for the device 120.

Size of detection device may be reduced and no dichroic filter (or hot mirror) element is required at all. Power supply for the imaging device 110 can be separated for illumination and recording parts. Efficient energy consumption is enabled especially in case of head mounted devices.

Figure 5:
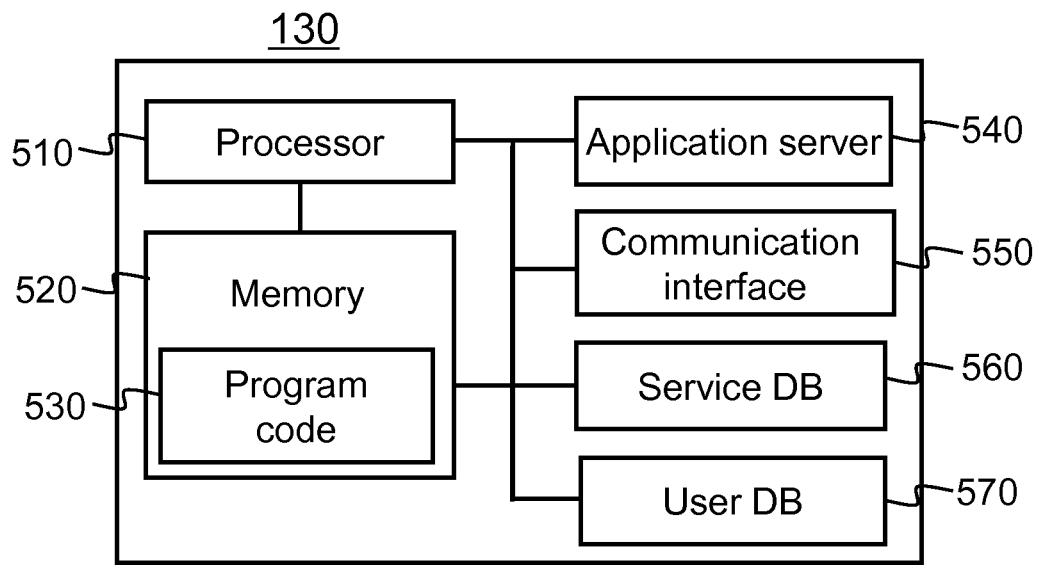
FIG. 5 shows a block diagram of a cloud server apparatus of an example embodiment.

FIG. 5 presents an example block diagram of a server apparatus 130 in which various embodiments may be applied. All elements described in FIG. 5 are not necessary to be implemented in the same apparatus 130.

The general structure of the server apparatus 130 comprises a processor 510, and a memory 520 coupled to the processor 510. The server apparatus 130 further comprises software 530 stored in the memory 520 and operable to be loaded into and executed in the processor 510. The software 530 may comprise one or more software modules and can be in the form of a computer program product. The software 530 may comprise a server application 133 of FIG. 1.

The processor 510 may be, e.g., a central processing unit (CPU), a microprocessor, a digital signal processor (DSP), a graphics processing unit, or the like. FIG. 5 shows one processor 510, but the server apparatus 130 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 520 may be constructed as a part of the server apparatus 130 or it may be inserted into a slot, port, or the like of the server apparatus 130 by a user. The memory 520 may serve the sole purpose of storing data, or it may be constructed as a part of an apparatus serving other purposes, such as processing data.

The communication interface module 550 implements at least part of data transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module, for example. As the radio technologies are evolving and new replacing systems being developed, the new developed technologies can be used for the communication interface module 550 in view of different embodiments disclosed. The communication interface module 550 may also comprise non-RF connection, such as Light Fidelity (Li-Fi). The wired interface may comprise such as Ethernet or universal serial bus (USB), for example. The communication interface module 550 may be integrated into the server apparatus 130, or into an adapter, card or the like that may be inserted into a suitable slot or port of the server apparatus 130. The communication interface module 550 may support one radio interface technology or a plurality of technologies. Configuration information between the client device 120 and the system server 130 may be transceived using the communication interface 550. Similarly, account creation information between the system server 130 and a service provider may be transceived using the communication interface 550.

An application server 540 provides application services e.g. relating to the user accounts stored in a user database 570 and to the service information stored in a service database 560. Different application services may be provided to different users. The application server 540 may comprise a server application 133 of FIG. 1.

A skilled person appreciates that in addition to the elements shown in FIG. 5, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 6:
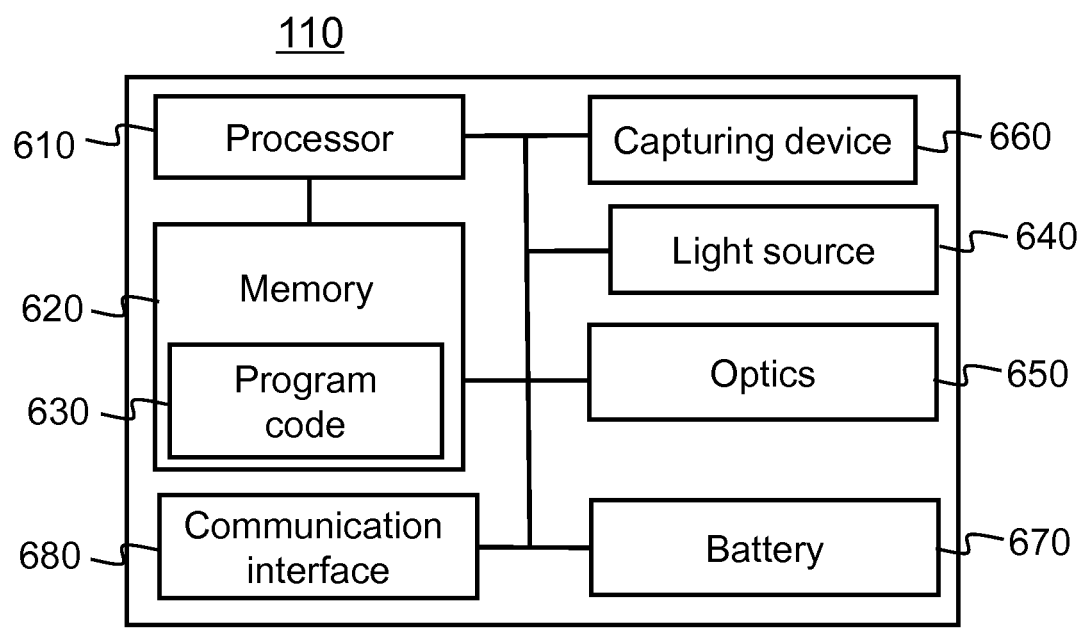
FIG. 6 shows a block diagram of a sensor device of an example embodiment.

FIG. 6 shows a block diagram of a sensor device 110 of an example embodiment.

The sensor device 110 is configured to determine element dimension related information based on light beams from light source or a glint pattern generated by the light source. The sensor/imaging device 110 may comprise a first battery 670 configured to power the imaging device 110 but the device 110 may also be powered externally via a cable, for example. The imaging device 110 further comprises a light source 640 for forming illuminating light to the detected element, such as the plain bearing shell, and freeform optical elements 650 configured to guide and form the illuminating light from the light source 640 to the capturing device 660, wherein the illuminating light may even be configured to be dynamically adjustable to generate a dynamic glint pattern on the detected region. The light glint pattern may be configured to be dynamic and adjustable using the light source and the freeform optics.

The imaging device 110 further comprises at least one memory 620 including computer program code 630, the at least one memory 620 and the computer program code 630 are configured to, with the at least one processor 610, cause the device 110 to receive settings comprising at least one of the following: environmental information of the apparatus and user profile information (e.g. sensor optical properties), to adjust the dynamic glint pattern based on the settings, and to capture an image of the desired bearing region using the capturing device 660. The captured image of the bearing region is transmitted to the apparatus 120 for generating plain bearing data, and further for generating the crush height information based on the detected data.

In an embodiment, the apparatus is configured to determine reflected glint pattern data from the generated plain bearing data based on the first captured image; and determine crush height of the plain bearing shell using the reflected glint pattern data and the housing reference data. Reflected glint pattern data may be determined from the generated plain bearing data based on the first captured image, plain bearing shell parameter determined using the reflected glint pattern data; and the plain bearing data generated or updated using the bearing shell parameter. The bearing shell parameter comprises at least one of the following: a circumferential length of the bearing; a free spread of the bearing; smoothness information of the bearing surface; a bearing shell form; and a thickness of the bearing shell, for example.

The imaging device 110 may further comprise a communication interface 680 for transceiving information with an apparatus 120 (see FIG. 1), the apparatus 120 comprising a second battery configured to power the apparatus, and a sensor device that is configured to detect light pattern data of the bearing region based on the image of the bearing region and generate bearing data.

In an embodiment, the optical system 650 may comprise an imaging light guide between a detected element and a sensor device. The light guide may comprise a borescope tube. Borescope is an optical device comprising a rigid or flexible tube with an objective lens on one end linked with other end by a relay optical system in between.

The imaging device 110 may be integrated as part of the client device 120 or as separate device connected to the client device 120.

Figure 7:
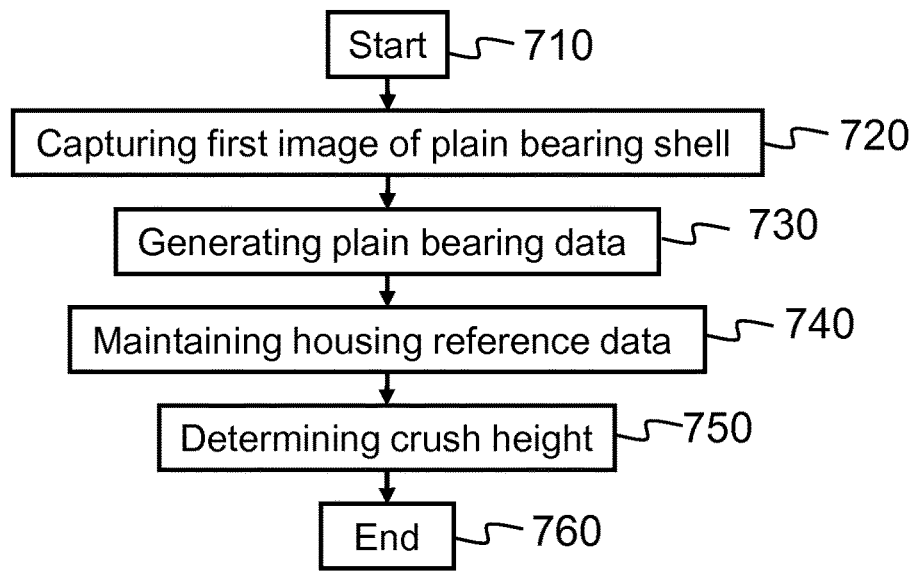
FIG. 7 shows a flow chart of a process of an example embodiment.

FIG. 7 shows a flow chart of a process according to an example embodiment.

A computer implemented method starts in step 710. The computer-implemented method is suitable for determining crush height of a plain bearing shell.

In step 720, a first image of the plain bearing shell in a first mode is captured, wherein no external compression stress in a circumference direction of the plain bearing shell is formed. In step 730, plain bearing data is generated based on the first captured image. In step 740, housing reference data comprising at least diameter information of a bore for receiving the plain bearing shell is received or maintained. In step 750, crush height of the plain bearing shell is determined based on the plain bearing data and the housing reference data. In step 760, the method ends.

In an embodiment, environmental data comprising current measurement temperature and plain bearing shell operating temperature are maintained within the system. Target contact pressure for the plain bearing shell to press to the housing surface when in the operating temperature is then received. After that material information of the plain bearing shell is determined based on the first image, and material information of the housing is determined based on the second image. Next, operation crush height of the plain bearing shell is determined based on the material information and the environmental data, and target crush height is defined based on the operation crush height and the environmental data. Finally, the target crush height may be compared with the determined crush height, and the plain bearing shell is approved for installation for operation if the determined crush height is bigger than the target crush height.

Figure 8:
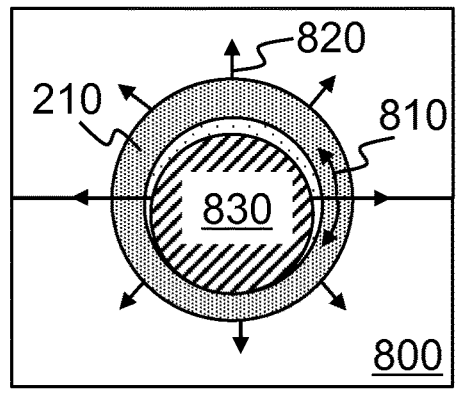
FIG. 8 illustrates a bearing (two bearing shells) installed in the housing.

FIG. 8 shows schematic drawings of crush height measurement details of example embodiments.

Peripheral length is one of most critical features on half shell bearings. Assembly of a half shell bearing is based on radial pressure between a bearing housing and the shell. Bearing peripheral length on free conditions is bigger than circular length of the bearing housing. Thus, the radial pressure is created by pressing two half shells to the bearing housing so that the peripheral length difference is pressed away.

Difference of bearing peripheral length on assembled conditions and free conditions is called bearing nip or crush height. Nip is typically defined under test pressure on housing. Traditionally the bearing peripheral length is measured by nip checking tool. This requires, however, special equipment, such as a large nip checking machine, wherein the machine requires bearing specific checking block and that makes it impossible to check the crush height on field circumstances.

However, through different embodiments disclosed, the peripheral length can be measured optically with sensor device and processing means.

A firmly tightened bearing 210 has uniform contact with the housing 800 surface, which fulfils the following functions:

prevents bearing 210 fretting and spinning in the housing 800 during operation provides maximum heat transfer through the contacting surfaces increases the rigidity of the housing 800.

FIG. 8 illustrates a bearing (two bearing shells) 210 installed in the housing 800. When the bearing 210 is assembled and the two parts of the housing 800 are tightened, a compression stress 810 in the circumference direction of the bearing 210 back is formed. The stress 810 causes the bearing 210 to press to the housing 800 surface at a contact pressure 820. The value of the radial contact pressure 820 determines the ability of the bearing 210 to transfer the heat produced by friction.

The contact pressure 820 also produces a friction between the bearing 210 back and the housing 800 surface that contradicts the friction generated by the journal/shaft 830 rotating in the bearing 210. The torque of the friction force formed between the bearing 210 back and the housing 800 prevents the bearing 210 from shifting in the housing 800.

High performance bearings 210 working at heavy loads, high rotation speeds and increased temperatures should be installed with a higher contact pressure 820. This provides better heat transfer and secures the bearing 210 more tightly in the housing 800.

Figure 9:
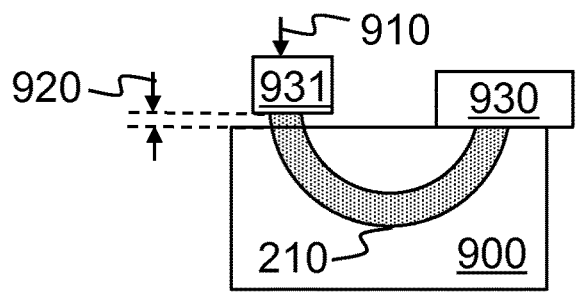
FIG. 9 illustrates crush height definition of a bearing installed in the housing.

FIG. 9 illustrates crush height definition of a bearing installed in the housing 900.

In order to achieve a required contact pressure, the outside diameter of an engine bearing 210 is produced greater than the diameter of its housing 900 bore for receiving the bearing shell. Such installation technique is called press fit (or interference fit). The difference between the diameters is called interference.

The difference between the diameters affects the amount of elastic compression of the bearing 210 installed in the housing 900 and determines the value of the contact pressure 820 (see FIG. 8) of the bearing 210.

Since direct measurement of the bearing 210 circumference is a challenging task, another parameter characterizing the bearing press fit is commonly measured, that is crush height 920. Crush height 920 is the difference between the outside circumferential length of a half bearing 210 (one half shell) and half of the housing circumference (bore) measured at a certain press load 910.

In prior known systems the tested bearing 210 has to be installed in the gauge block (requiring equipment 930-931) and pressed with a predetermined force 910. The force 910 is proportional to the cross-section area of the bearing wall.

The optimal value for crush height 920 is dependent on the bearing diameter, housing material (modulus of elasticity and thermal expansion), housing dimensions and stricture (rigidity), and temperature.

Figure 10:
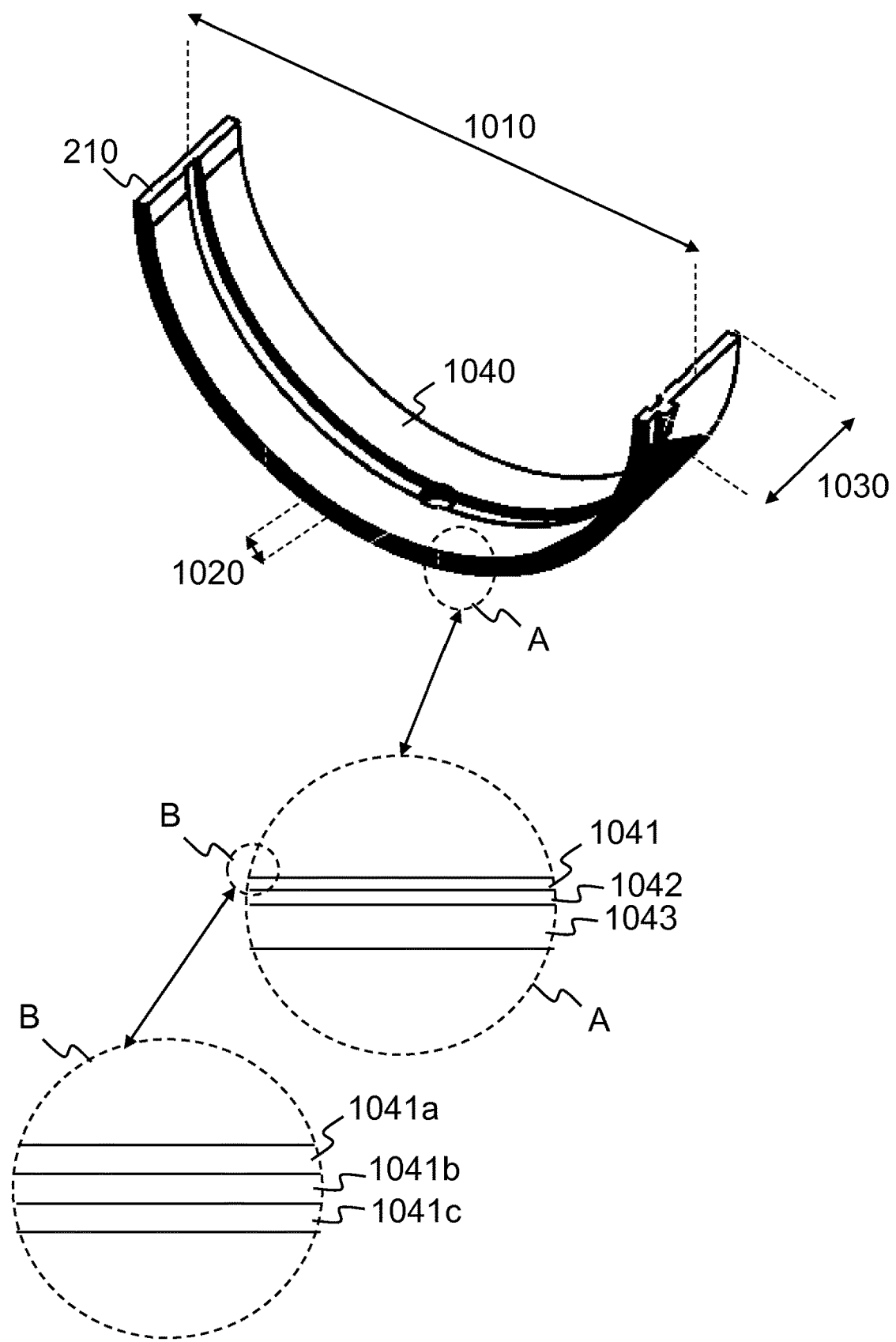
FIG. 10 illustrates a bearing that is analysed based on the measuring apparatus.

FIG. 10 illustrates a bearing 210 that is analysed based on the measuring apparatus 110, 120 (see e.g. FIGS. 1-2). There are number of important considerations to be taken into account when considering bearings.

The bearing 210 (as well as the housing) inner surface 1040 must be clean. Especially the surfaces between the bearing 210 and the housing needs to be checked, as well as the joint faces of the bearings.

A bearing 210 is provided with a free spread 1010 to ensure that both halves assemble correctly and do not foul the shaft along the joint line when assembled.

Nip measurement describes crush height under a certain pressure, so It includes material properties as well as geometrical dimension in one value.

The apparatus is configured to measure and determine circumferential length of the bearing 210, which must be correlated with proper nip measurement. The apparatus may be further configured to measure and determine free spread 1010, bearing shell form, bearing shell length 1030 and bearing shell thickness 1020, for example.

The bearing 210 may comprise a Tin Aluminium bearing that is configured to carry high loads. As a bearing material, unalloyed Aluminium tends to seize to a steel mating surface. It is found that 20% of Tin added to the Aluminium improved seizure resistance and that cold working and annealing helped to prevent brittleness. Unique features are their good resistance to corrosion, high thermal conductivity and high fatigue strength but they may have the disadvantages of only moderate embedding properties, poor compatibility and high coefficients of thermal expansion. If used as solid unbacked bearings this type of alloy is usually too weak to maintain an interference fit and too hard to run satisfactorily against an unhardened shaft. Considerable improvement in antiscoring characteristics and embeddability is obtained by using a thin-lead babbitt or electrodeposited lead-tin overlay. Alloys containing 20 to 40% Tin, remainder Aluminium, show excellent resistance to corrosion by products of oil breakdown and good embeddability. The sliding properties of this composition are very similar to those of Tin based white metal, but the loading capacity of this material is higher than Tin based white metals for the same working temperature; this is due to the ideal combination of Tin and Aluminium, where Tin gives the good embeddability and sliding properties, while the Aluminium mesh functions as an effective load absorber. The higher-tin alloys (40%) have adequate strength and better surface properties, which make them useful for main and crosshead bearings in high-power marine diesel engines, for example.

The bearing 210 may also comprise multilayer thin wall bearing that is used in e.g. diesel engines. Multilayer thin wall structure is illustrated for part A of the bearing 210. Babbitt metal of layer 1041 lacks fatigue strength. It may break down under load. The durability of Babbitt 1041 greatly increases as the material decreases in thickness. The solution is to apply a thin layer of Babbitt metal 1041 over a supporting layer of copper/lead 1042 that acts as a cushioning layer and allows for slight misalignment. Next to the copper/lead layer 1042 is steel backing layer 1043. Babbitt metal of layer 1041 structure is illustrated for part B of the layer 1041. A modern tri-metal bearing in fact may have five layers when the Babbitt metal layer 1041 comprises tin flash layer 1041*a*, tin antimony layer 1041*b* and nickel layer 1041*c*. The nickel barrier plating 1041*c* prevents or limits diffusion of metallic components from the babbitt antifriction layer 1041 into the copper/lead 1042 supporting layer and vice versa. The tin flash coating 1041*a* is to protect and provide a dry lubricant.

In an embodiment, the apparatus for determining crush height of a plain bearing shell is configured to capture a first image of the plain bearing shell 210 in a first mode, wherein no external compression stress in a circumference direction of the plain bearing shell 210 is formed, and to generate plain bearing data based on the first captured image. The first image may comprise data of the surface layer 1041 and dirt particles within the layer may be detected, for example. Based on the first image data, quality information may be determined and maintained as part of the plain bearing data. The quality information may be used for automatic selecting of the bearing for certain assembly or housing bore, as well as for pairing the bearing shell with an optimal second plain bearing shell.

Without in any way limiting the scope, interpretation, or application of the claims appearing below, a technical effect of one or more of the example embodiments disclosed herein is improved method and apparatus for detecting crush height information of a plain bearing.

Another technical effect of one or more of the example embodiments disclosed herein is that more convenient user experience from the point of operating user is enabled.

Another technical effect of one or more of the example embodiments disclosed herein is that a faster and more flexible solution is provided for crush height detection.

Another technical effect of one or more of the example embodiments disclosed herein is that system and service is cost efficient and easy-to-use.

Another technical effect of one or more of the example embodiments disclosed herein is that selection of plain bearing shell pairs is optimised.

Another technical effect of one or more of the example embodiments disclosed herein is that quality inspection of plain bearing shells are improved.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments, these descriptions should not be viewed in a limiting sense. Rather, there are several variations and modifications, which may be made without departing from the scope of the disclosed embodiments as defined in the appended claims.

The invention claimed is:

1. An apparatus for determining crush height of a plain bearing shell, comprising:
   a light source for forming illuminating light to the plain bearing shell;
   a sensor device configured to capture an image;
   at least one memory including computer program code;
   the at least one memory and the computer program code configured to, with the at least one processor, cause the apparatus to:
   capture a first image of the plain bearing shell in a first mode, wherein no external compression stress in a circumference direction of the plain bearing shell is formed;
   generate plain bearing data based on the first captured image;
   maintain housing reference data comprising at least diameter information of a bore for receiving the plain bearing shell; and
   determine crush height of the plain bearing shell based on the plain bearing data and the housing reference data.

2. The apparatus of claim 1, wherein the plain bearing data comprises at least one of the following:
   a circumferential length of the plain bearing shell;
   a free spread of the plain bearing shell;
   a bearing shell form; and
   a thickness of the plain bearing shell.

3. The apparatus of claim 1, wherein the at least one memory and the computer program code configured to, with the at least one processor, cause the apparatus to:
   determine outside circumferential length of the plain bearing shell based on the first captured image; and
   determine the plain bearing data to comprise the outside circumferential length of the plain bearing shell.

4. The apparatus of claim 3, wherein the at least one memory and the computer program code configured to, with the at least one processor, cause the apparatus to:
   maintain plain bearing reference data comprising material information of at least one plain bearing shell.

5. The apparatus of claim 1, wherein the at least one memory and the computer program code configured to, with the at least one processor, cause the apparatus to:
   maintain housing reference data further comprising material information of at least one housing with the bore for receiving the plain bearing shell.

6. The apparatus of claim 4, wherein the material information is configured to be used to determine coefficient of thermal expansion for at least one of the plain bearing shell and the housing.

7. The apparatus of claim 6, wherein the at least one memory and the computer program code configured to, with the at least one processor, cause the apparatus to:
   maintain environmental data comprising current measurement temperature and plain bearing shell operating temperature.

8. The apparatus of claim 4, wherein the at least one memory and the computer program code configured to, with the at least one processor, cause the apparatus to:
   determine material information of the plain bearing shell based on the captured first image and the plain bearing reference data; and
   determine coefficient of thermal expansion for the plain bearing shell based on the material information.

9. The apparatus of claim 1, wherein the at least one memory and the computer program code configured to, with the at least one processor, cause the apparatus to:
   capture a second image of the plain bearing shell in a second mode, wherein the plain bearing shell is fitted to the bore of the housing and external compression stress in a circumference direction of the plain bearing shell is formed; and
   generate the housing reference data based on the second image.

10. The apparatus of claim 9, wherein the at least one memory and the computer program code configured to, with the at least one processor, cause the apparatus to:
    determine material information of the housing based on the captured second image and the housing reference data; and
    determine coefficient of thermal expansion for the housing based on the material information.

11. The apparatus of claim 9, wherein the at least one memory and the computer program code configured to, with the at least one processor, cause the apparatus to:
    maintain environmental data comprising current measurement temperature and plain bearing shell operating temperature;
    receive target contact pressure for the plain bearing shell to press to the housing surface when in the operating temperature;
    determine material information of the plain bearing shell based on the first image;
    determine material information of the housing based on the second image;
    determine operation crush height of the plain bearing shell based on the material information and the environmental data;
    define target crush height based on the operation crush height and the environmental data;
    compare the target crush height with the determined crush height; and
    approve the plain bearing shell for installation for operation if the determined crush height is bigger than the target crush height.

12. The apparatus of claim 1, wherein the light source comprises a plurality of light transmitters, at least one of them is configured to emit light in different spectral band and/or in different intensity,
    wherein at least one of the light transmitters is configured to emit light with a wavelength between 800-2600 nm and/or with adjustable intensity.

13. The apparatus of claim 1, further comprising a communication interface for transceiving information, wherein the at least one memory and the computer program code configured to, with the at least one processor, cause the apparatus to:
    receive settings, from a cloud server, comprising at least one of the following:
    environmental data;
    plain bearing reference data;
    plain bearing data; and
    housing reference data; and
    adjust corresponding data at the apparatus based on the settings.

14. The apparatus of claim 1, wherein the sensor device comprises a storage element operable to output a sequence of reset and measurement values; and a configurable sampler coupled to the storage element to sample the sequence of reset and measurement values within an exposure interval, the exposure interval encompassing a plurality of measurement intervals, the sampler supporting sample modes, including: a first sample mode operable to produce a first output derived from one of the reset values and an adjacent measurement value, the first sample mode operating in a first of the measurement intervals; a second sample mode operable to produce a second output derived from one of the measurement values and an adjacent reset value, the second sample mode operating in a second of the measurement intervals; and a transition mode operable to switch between the first and second sample modes responsive to at least one of the first and second outputs, the transition between the first and second sample modes occurring within the exposure interval.

15. The apparatus of claim 1, wherein the at least one memory and the computer program code configured to, with the at least one processor, cause the apparatus to:
define a first operational mode, wherein a photodetector of the sensor device is reset after each measurement interval, and pixel's intensity is measured with reference to that pixel's reset value;
define a second operational mode, wherein the photodetector of the sensor device is allowed to charge to accumulate on photodiode of the sensor device over multiple measurement intervals during an exposure, and pixel's intensity is measured with reference to that pixel's reset value; and
define a third operational mode, wherein pixel's intensity is measured with respect to a reference that is not derived from the pixel.

16. The apparatus of claim 15, wherein the at least one memory and the computer program code configured to, with the at least one processor, cause the apparatus to:
select used operational mode based on at least one of the following: ambient light information provided by an ambient light sensor, used wavelength(s) for illumination, and reference data maintained for the measured plain bearing shell.

17. The apparatus of claim 1, wherein the at least one memory and the computer program code configured to, with the at least one processor, cause the apparatus to:
determine crush height of a first plain bearing shell based on the plain bearing data associated with the first plain bearing shell and the housing reference data;
determine crush height of a second plain bearing shell based on plain bearing data associated with the second plain bearing shell; and
select the second plain bearing shell to be paired with the first plain bearing shell based on the plain bearing data associated with the first and the second plain bearing shells and the housing reference data.

18. The apparatus of claim 17, wherein the at least one memory and the computer program code configured to, with the at least one processor, cause the apparatus to:
determine a plurality of parameters based on optical measurement, comprising at least two of the following: a circumferential length of the bearing; a free spread of the bearing; a bearing shell form; and a thickness of the bearing;
determine a weight value and a range for the determined parameters where the plain bearing shell is acceptable as a single plain bearing shell and as combination with another plain bearing shell to provide weighted parameters; and
determine pairing of the plain bearing shells for an assembly bore by selecting the paired plain bearing shells based on the weighted parameters.

19. A computer program embodied on a non-transitory computer readable medium comprising computer executable program code, which code, when executed by at least one processor of an apparatus, causes the apparatus to:
capture a first image of the plain bearing shell in a first mode, wherein no external compression stress in a circumference direction of the plain bearing shell is formed;
generate plain bearing data based on the first captured image;
maintain housing reference data comprising at least diameter information of a bore for receiving the plain bearing shell; and
determine crush height of the plain bearing shell based on the plain bearing data and the housing reference data.

20. A computer implemented method for determining crush height of a plain bearing shell, comprising:
capturing a first image of the plain bearing shell in a first mode, wherein no external compression stress in a circumference direction of the plain bearing shell is formed;
generating plain bearing data based on the first captured image;
maintaining housing reference data comprising at least diameter information of a bore for receiving the plain bearing shell; and
determining crush height of the plain bearing shell based on the plain bearing data and the housing reference data.

* * * * *